Patented May 21, 1929.

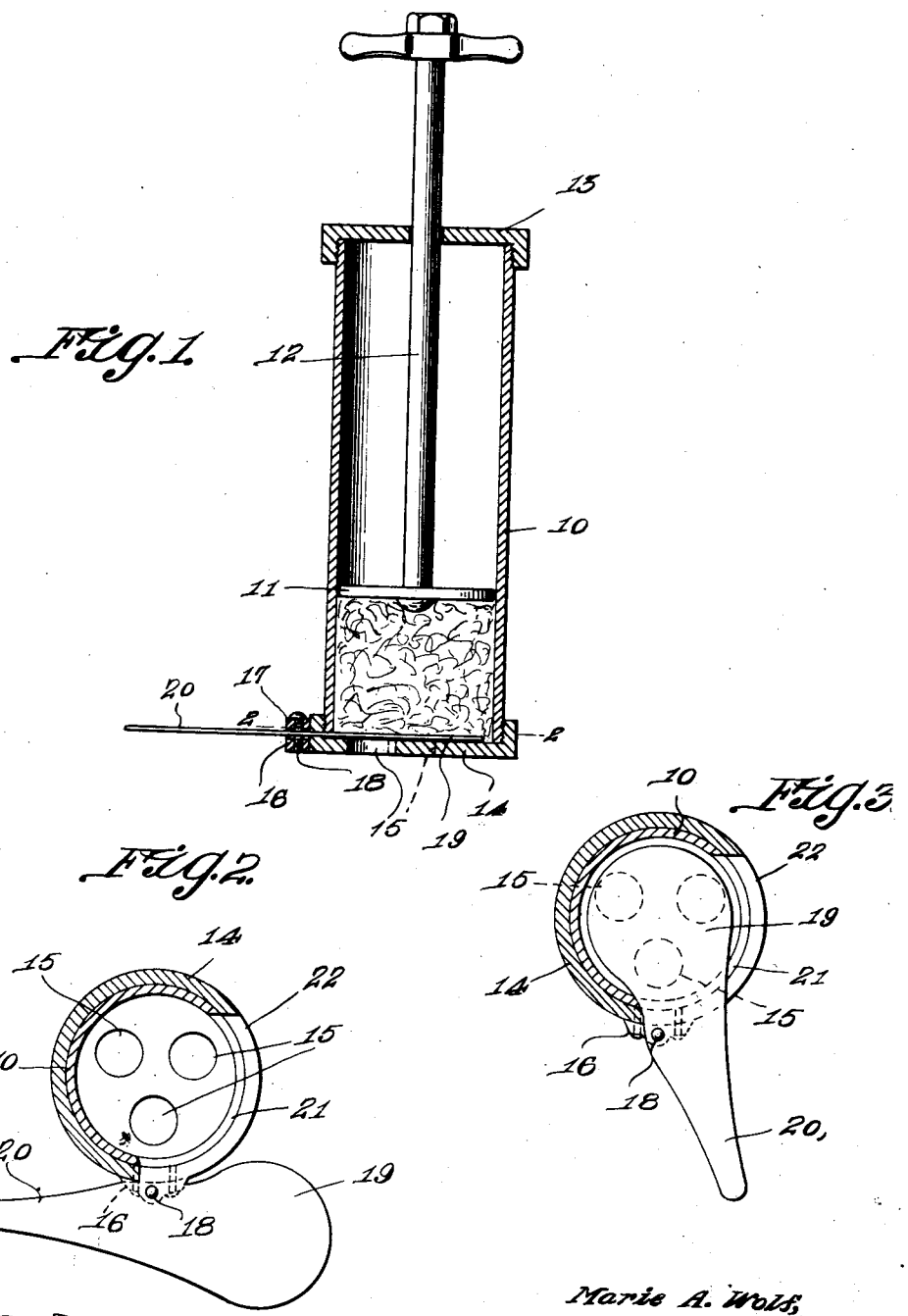

1,713,585

UNITED STATES PATENT OFFICE.

MARIE A. WOLF, OF CINCINNATI, OHIO.

APPARATUS FOR PRODUCING EDIBLE CURLS.

Application filed February 10, 1928. Serial No. 253,439.

This invention has particular relation to plunger devices adapted to discharge dough and confections in curled form.

An object of the invention contemplates a reducer for the plunger through which the contents of the plunger are discharged in the formation of the curls.

Another object of the invention comprehends a cut-off for the plunger apparatus to control the discharge through the reducer and to regulate the length of the curls.

With the above and other objects in view, the invention further consists of the following novel features and details of construction, to be hereinafter more fully described, illustrated in the accompanying drawing and pointed out in the appended claim.

In the drawing:—

Figure 1 is a longitudinal sectional view taken through the invention.

Figure 2 is a transverse sectional view taken on line 2—2 of Figure 1.

Figure 3 is a view similar to Figure 2 showing the cut off valve disposed in operative use.

Referring to the drawing in detail, wherein like characters of reference denote corresponding parts, the reference character 10 indicates a cylinder or barrel within which a plunger member 11 carried upon a plunger rod 12 and extended through a closure cap 13, is adapted for reciprocating action therein.

A reducer, in the nature of a closure cap 14, secured upon the opposed end of the barrel or cylinder 10 in a similar manner to that of the closure cap 14, is provided with a multiplicity of discharge openings 15, the purpose of which will be presently apparent. Ears 16 and 17, projected from the closure cap 14 in spaced superimposed relation, are adapted to receive a pivot pin 18 therebetween for swingably mounting a cut off valve 19 having an operating handle 20. The cut off valve when laterally swung upon the pivot 18 is adapted to enter the cylinder or barrel 10 through registering slotted portions 21 and 22 in the barrel 10 and closure cap 14 respectively.

It will be noted that the cut off valve 19 when shifted to occupy the position as shown in Figure 3 of the drawing, the discharge of the contents of the cylinder through the discharge openings 15 will be prevented.

The cylinder may be filled with a medium soft dough and which when discharged therefrom will make a plurality of curls, which are dropped into hot lard or oil until a golden brown. The production may be served either with whipped cream or dusted with confectioner's sugar.

The invention may also be effectively employed for decorating cakes and other pastries.

After an appreciable quantity of the contents of the barrel has been discharged within a receptacle, the barrel may then be rotated simultaneously with the compressing of the plunger therein to cause the curls to wrap and spiral one around the other to provide sticks in the form of twisted strands.

The invention is susceptable of various changes in its form, proportions and minor details of construction, and the right is herein reserved to make such changes as properly fall within the scope of the appended claim.

Having described the invention, what is claimed is:

A device for producing edible curls comprising a cylinder, a plunger member operable therein, a reducer carried upon the discharge end of the cylinder being provided with a multiplicity of discharge openings within the bottom thereof, the cylinder and reducer being provided with registering slotted portions, and a cut off valve mounted for lateral swinging movement upon the reducer being adapted for reception within the cylinder through the registering slotted portions to sever curls of a desired length and to normally provide a false bottom for the cylinder.

In testimony whereof I affix my signature.

MARIE A. WOLF.